United States Patent
Hatin et al.

(10) Patent No.: US 12,483,432 B2
(45) Date of Patent: Nov. 25, 2025

(54) METHOD FOR DELEGATING ACCESS TO A BLOCKCHAIN

(71) Applicant: ORANGE, Issy-les-Moulineaux (FR)

(72) Inventors: Julien Hatin, Chatillon (FR); Baptiste Hemery, Chatillon (FR); Emmanuel Bertin, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 317 days.

(21) Appl. No.: 18/251,801

(22) PCT Filed: Nov. 3, 2021

(86) PCT No.: PCT/FR2021/051938
§ 371 (c)(1),
(2) Date: May 4, 2023

(87) PCT Pub. No.: WO2022/096824
PCT Pub. Date: May 12, 2022

(65) Prior Publication Data
US 2023/0412405 A1  Dec. 21, 2023

(30) Foreign Application Priority Data
Nov. 6, 2020 (FR) ...................... 2011420

(51) Int. Cl.
*H04L 29/06* (2006.01)
*H04L 9/00* (2022.01)
*H04L 9/32* (2006.01)

(52) U.S. Cl.
CPC ................ *H04L 9/50* (2022.05); *H04L 9/321* (2013.01)

(58) Field of Classification Search
CPC ......... H04L 9/50; H04L 9/321; H04L 9/3239; H04L 9/3268; H04L 9/0891
See application file for complete search history.

(56) References Cited

U.S. PATENT DOCUMENTS 10,320,843 B1 * 6/2019 Dobrek ................. H04L 9/0822
12,088,541 B1 * 9/2024 Kheit .................... H04L 51/046
(Continued)

FOREIGN PATENT DOCUMENTS

CN 109510760 A 3/2019

OTHER PUBLICATIONS

English translation of the Written Opinion of the International Searching Authority dated Feb. 10, 2022 for corresponding International Application No. PCT/FR2021/051938, filed Nov. 3, 2021.
(Continued)

*Primary Examiner* — Mahfuzur Rahman
(74) *Attorney, Agent, or Firm* — David D. Brush; Westman, Champlin & Koehler, P.A.

(57) ABSTRACT

A method for delegating access to a blockchain. The method is carried out by an access delegation device and includes: receiving an execution request from a terminal, including at least one identifier of a user and at least one command to execute an action within the blockchain, the command being encrypted via at least one encryption key belonging to the user; obtaining, according to the at least one identifier of the received user, at least one decryption key of the user for decrypting the execution command; decrypting the execution command; and sending, to the blockchain, a request for executing the decrypted execution command via the at least one decryption key.

10 Claims, 1 Drawing Sheet

(56) References Cited

U.S. PATENT DOCUMENTS

| | | | | |
|---|---|---|---|---|
| 12,099,997 | B1* | 9/2024 | Hoffberg | G06Q 20/065 |
| 2019/0013943 | A1* | 1/2019 | Maim | H04L 9/30 |
| 2019/0372786 | A1* | 12/2019 | Ra | G06F 21/30 |
| 2020/0058023 | A1* | 2/2020 | Travizano | H04L 9/3239 |
| 2020/0320417 | A1* | 10/2020 | Corning | G06F 21/85 |
| 2020/0387893 | A1* | 12/2020 | Maim | G09C 1/00 |
| 2020/0396079 | A1* | 12/2020 | Dekant | H04L 9/3236 |
| 2021/0006400 | A1* | 1/2021 | Hu | H04L 9/3239 |
| 2023/0412405 | A1* | 12/2023 | Hatin | H04L 9/3239 |
| 2024/0046318 | A1* | 2/2024 | Muriqi | G06Q 30/0273 |

OTHER PUBLICATIONS

Reis Miguel Reis Egidio, "Blockchain-Enabled DPKI Framework", Sep. 1, 2019 (Sep. 1, 2019), Retrieved from the Internet: URL:https://run.unl.pt/bitstream/10362/96660/1/Reis_2019.pdf, XP055816425.

Dittmann Gero et al., "A Blockchain Proxy for Lightweight IoT Devices", 2019 Crypto Valley Conference on Blockchain Technology (CVCBT), IEEE, Jun. 24, 2019 (Jun. 24, 2019), p. 82-85, XP033590955.

Özyilmaz Kazim Rifat et al., "Work-in-progress: integrating low-power IoT devices to a blockchain-based Infrastructure", 2017 International Conference on Embedded Software (EMSOFT), ACM, Oct. 15, 2017 (Oct. 15, 2017), p. 1-2, XP033269936.

International Search Report dated Feb. 10, 2022 for corresponding International Application No. PCT/FR2021/051938, filed Nov. 3, 2021.

Written Opinion of the International Searching Authority dated Feb. 10, 2022 for corresponding International Application No. PCT/FR2021/051938, filed Nov. 3, 2021.

* cited by examiner

METHOD FOR DELEGATING ACCESS TO A BLOCKCHAIN

CROSS-REFERENCE TO RELATED APPLICATIONS

This Application is a Section 371 National Stage Application of International Application No. PCT/FR2021/051938, filed Nov. 3, 2021, which is incorporated by reference in its entirety and published as WO 2022/096824 A1 on May 12, 2022, not in English.

1. FIELD OF THE INVENTION

The invention relates to the general field of telecommunications networks, and more precisely to blockchain technology.

2. PRIOR ART

It will be recalled that "blockchain technology is a technology for storing and transmitting information without central control. Technically, a blockchain is a distributed database the information of which is submitted by users, and links internal to the database are verified and grouped at regular time intervals into blocks, all of these being secured by cryptography, and thus forming a chain. By extension, a blockchain is a distributed database that manages a list of records protected against tampering or modification by storage nodes; it is therefore a distributed and secure register of all the transactions carried out since the start of the distributed system". Blockchains are furthermore characterized in that their contents cannot be modified or deleted: information published in a blockchain remains so forever. Information "published" in a blockchain denotes information recorded or saved therein. One problem that arises in the context of blockchain technology is that of access thereto, and more specifically that of carrying out operations within a blockchain, such as for example the deployment or execution of a "smart contract". A "smart contract" is for example a digital version of a traditional contract, that is to say a computer program that makes it possible to facilitate, execute and impose the negotiation or execution of an agreement using blockchain technology. One of the main purposes of a "smart contract" is to allow two anonymous parties to conduct transactions with one another without the need for an intermediary.

To interact with a blockchain, a user must possess a set of elements, such as cryptographic keys, to allow them to authenticate themselves with the blockchain. All of this requires an enrolment process for each blockchain user, which may be cumbersome and tedious. This mode of operation is also not suitable for a company that might wish to reuse its internal public key infrastructure, which infrastructure makes it possible to link public keys to the identities of the company's employees, in order to allow certain employees to access a blockchain. In the same way, this mode of operation does not make it possible to facilitate access to the blockchain via for example an SSO (Single Sign-On) single authentication solution. Moreover, some small parties may wish to delegate the management of their operations within a blockchain to specialized service providers in the field for reasons of practicality. There is therefore a need to delegate access rights to a blockchain.

3 SUMMARY OF THE INVENTION

The invention aims to improve the prior art and proposes a method for delegating access to at least one first blockchain, implemented by an access delegation device, the method being characterized in that it comprises:

a step of receiving an execution request from a terminal, said request comprising at least one identifier of a user and at least one execution command to execute an action within said at least one first blockchain, said command being encrypted via at least one encryption key belonging to said user;

a step of obtaining, on the basis of said at least one received identifier of said user, at least one decryption key of said user allowing said execution command to be decrypted;

a step of decrypting said execution command;

a step of transmitting, to said at least one first blockchain, an execution request to execute said execution command decrypted via said at least one decryption key.

The invention thus proposes a method for delegating access and the execution of an action within a blockchain. The present patent application is presented in the context of a "blockchain", but the expression "blockchain" is to be understood to cover any type of distributed ledger technology (DLT) able to host decentralized applications (DApps), the actual blockchains of which are just one particular element.

From a practical point of view, the invention offers a novel mechanism in which, when a user wishes to carry out an operation at the level of a blockchain, said user will transmit, to a third party such as a trusted operator, an execution request to execute an action comprising one or more of their identifiers and the encrypted execution command to execute the action via an encryption key belonging to them. The access delegation method carried out by the third party will then, by virtue of the received identifier, obtain one or more decryption keys belonging to the user. When the one or more decryption keys make it possible to decrypt the execution command, then the method will transmit the execution request to execute the decrypted execution command to the blockchain.

A user identifier is understood to mean a character string that makes it possible to uniquely identify the user, such as a number, an email address, an identity card number, a subscriber number, etc.

An encryption key (or cryptographic key) is understood to mean a key that makes it possible to guarantee the confidentiality of a datum via its coding. A decryption key (or cryptographic key) is understood to mean a key that makes it possible to decode a datum coded via an encryption key.

According to one particular mode of implementation of the invention, a method as described above is characterized in that said at least one decryption key of said user is obtained from at least one second blockchain.

This mode of implementation makes it possible to obtain, from a distributed and secure register, the one or more decryption keys of the user allowing the execution of the execution command that they wish to perform within a blockchain. In specific terms, this implies that the user has previously enrolled within the blockchain via their own means or by virtue of the trusted third party. During this enrolment, their one or more decryption keys were provisioned for example in a smart contract managed by the trusted third party. It should be noted that decentralized applications, such as for example dApps of the Ethereum project, constitute smart contracts within the sense of the invention.

According to one particular mode of implementation of the invention, a method as described above is characterized in that said at least one first blockchain corresponds to said at least one second blockchain.

This mode of implementation makes it possible to consider one and the same blockchain both for obtaining one or more decryption keys of the user allowing the execution of the execution command and for executing the execution command as such.

Advantageously, this mode of implementation may allow the use of different pairs of encryption/decryption keys depending on the blockchains, each blockchain being able to host a different decryption key.

According to one particular mode of implementation of the invention, a method as described above is characterized in that the reception step is preceded by a step of authenticating said user.

This mode of implementation makes it possible to avoid for example denial of service attacks and guarantees access to services for legitimate users.

According to one particular mode of implementation of the invention, a method as described above is characterized in that the transmission step is preceded by a step of publishing, in said at least one first blockchain, said at least one identifier of said user and said decrypted execution command and/or said encrypted execution command.

This mode of implementation makes it possible to store and share the submitted execution command and the identity of whoever requested its execution. The actions carried out by the method are thus recorded and timestamped.

According to one particular mode of implementation of the invention, a method as described above is characterized in that the decrypted execution command is a command to revoke said at least one decryption key of said at least one second blockchain.

This mode of implementation makes it possible to revoke a user's right to use the service. Indeed, if the user no longer has the right to use the decryption key stored in the blockchain, then the method will not be able to obtain the decryption key for decrypting the execution command for a subsequent execution request. The subsequent execution request therefore cannot be transmitted. This revocation is carried out by adding, to the blockchain, validity information associated with the user's decryption key. This validity information may be a Boolean, a character, a character string, a date, or any other information for determining the validity of the decryption key.

According to one particular mode of implementation of the invention, a method as described above is characterized in that the decrypted execution command is a command to deploy a smart contract within said at least one first blockchain.

This mode of implementation makes it possible to deploy a new smart contract at the level of a blockchain. It should be noted that decentralized applications dApps of the Ethereum project constitute smart contracts within the sense of the invention.

According to one particular mode of implementation of the invention, a method as described above is characterized in that the decrypted execution command is a command to execute a smart contract stored within said blockchain.

This mode of implementation allows for example a user to execute a decentralized application or one of its functions.

The invention also relates to a device for delegating access to at least one first blockchain, characterized in that it comprises:

- a module for receiving an execution request from a terminal, said request comprising at least one identifier of a user and at least one execution command to execute an action within said at least one first blockchain, said command being encrypted via at least one encryption key belonging to said user;
- a module for obtaining, on the basis of said at least one received identifier of said user, at least one decryption key of said user allowing said execution command to be decrypted;
- a module for decrypting said execution command;
- a module for transmitting, to said at least one first blockchain, an execution request to execute said execution command decrypted via said at least one decryption key.

The term module may correspond equally to a software component or to a hardware component or to a set of software and hardware components, a software component itself corresponding to one or more computer programs or subroutines or, more generally, to any element of a program able to implement a function or a set of functions such as described for the modules in question. In the same way, a hardware component corresponds to any element of a hardware assembly able to implement a function or a set of functions for the module in question (integrated circuit, chip card, memory card, etc.).

The invention also relates to a computer program comprising instructions for implementing the above method according to any one of the particular embodiments described above when said program is executed by a processor. The method may be implemented in various ways, in particular in hard-wired form or in the form of software. This program may use any programming language and be in the form of source code, object code or intermediate code between source code and object code, such as in a partially compiled form, or in any other desirable form.

The invention also targets a computer-readable recording medium or information medium containing instructions of a computer program such as mentioned above. The above-mentioned recording media may be any entity or device capable of storing the program. For example, the medium may comprise a storage means, such as a ROM, for example a CD-ROM or a microelectronic circuit ROM, or else a magnetic recording means, for example a hard disk. Moreover, the recording media may correspond to a transmissible medium such as an electrical or optical signal, which may be routed via an electrical or optical cable, by radio or by other means. The programs according to the invention may in particular be downloaded from the Internet.

As an alternative, the recording media may correspond to an integrated circuit in which the program is incorporated, the circuit being designed to execute or to be used in the execution of the method in question.

This access delegation device and this computer program have features and advantages analogous to those described above in relation to the access delegation method.

4. LIST OF THE FIGURES

Other features and advantages of the invention will become more clearly apparent upon reading the following description of particular embodiments, provided by way of simple illustrative and non-limiting examples, and the appended drawings, in which.

5. DESCRIPTION OF ONE EMBODIMENT OF THE INVENTION

Figure 1:
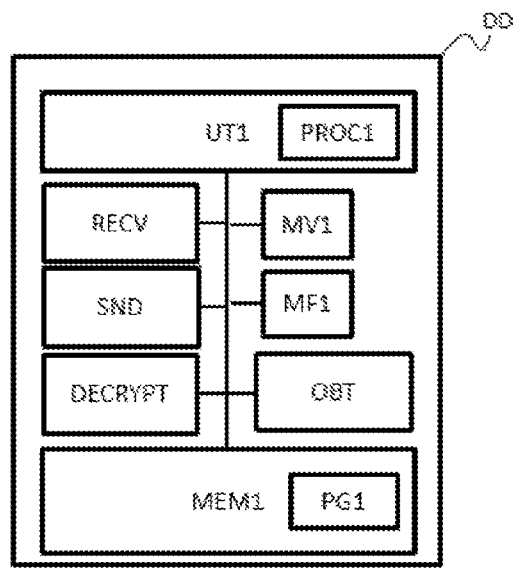
FIG. 1 shows the hardware architecture of an access delegation device according to one particular embodiment.

FIG. 1 shows the hardware architecture of an access delegation control device DD in accordance with the invention. In the embodiment described here, this device has the hardware architecture of a computer. It comprises in particular a processor PROC1, a random-access memory MV1, a read-only memory MEM1 and a non-volatile flash memory MF1. Such means are known per se and are not described in more detail here. The read-only memory is a recording medium according to the invention, which is able to be read by the processor PROC and on which there is recorded here a computer program PG1 according to the invention, this program comprising instructions for implementing the steps of the access delegation method such as described above when the program is executed by the processor PROC1.

On initialization, the code instructions of the computer program PG1 are for example loaded into a memory, before being executed by the processor PROC1. The processor PROC1 of the processing unit UT1 in particular implements the steps of the access delegation method according to any one of the particular embodiments described with reference to FIG. 2, according to the instructions of the computer program PG1.

The device DD also comprises a module RECV designed to receive an execution request, from a terminal of a user, comprising an identifier of the user and an encrypted execution command to execute an action to be carried out within a blockchain. The device DD additionally comprises an obtainment module OBT able to obtain a decryption key belonging to the user on the basis of the identifier of the user received via the module RECV. The device DD furthermore comprises a decryption module DECRYPT able to decrypt the encrypted execution command received via the module RECV. The device DD also comprises a module SND able to transmit, to a blockchain, an execution request to execute the execution command received and decrypted via the module DECRYPT by virtue of the decryption key obtained by the module OBT.

According to one particular embodiment of the invention, the modules RECV and SND may be one and the same communication module.

According to one particular embodiment of the invention, the device DD may also comprise a publication module (not shown) able to publish, in a blockchain, the decrypted and/or encrypted execution command and the identifier of the user.

According to one particular embodiment of the invention, the device DD may also comprise an authentication module (not shown) able to authenticate the user.

Figure 2:
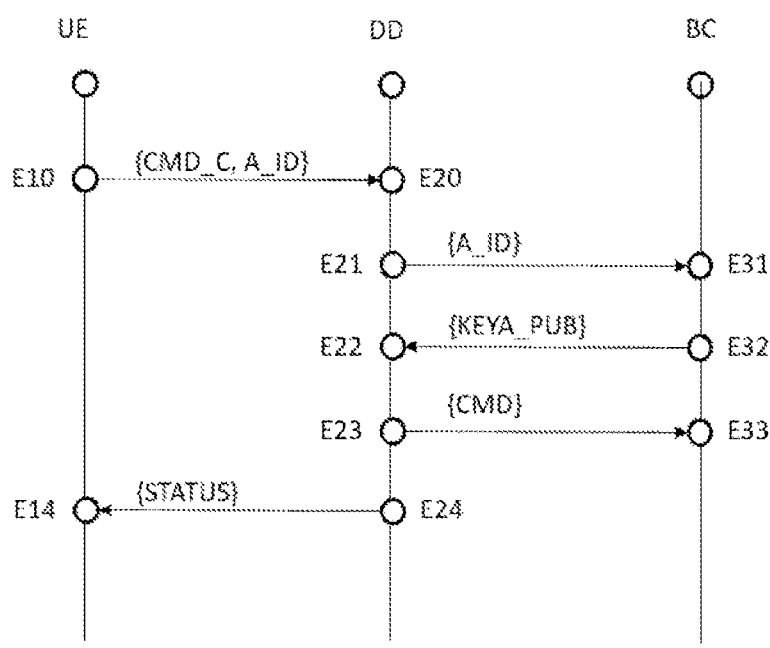
FIG. 2 shows, in the form of a flowchart, the main steps of an access delegation method in accordance with the embodiments of the invention.

With reference to FIG. 2, a description will now be given of the main steps E20, E21, E22, E23 and E24 of an access delegation method according to the embodiments of the invention. FIG. 2 consists of a terminal UE, an access delegation device DD that executes the access delegation method, and a blockchain BC. The terminal UE is for example a computer, a server, a mobile telephone, a connected object, or any other terminal able to transmit/receive requests. The access delegation device DD is for example a computer, a server, a mobile telephone, a connected object, or any other terminal able to transmit/receive requests. It will be assumed that the user Alice of the terminal UE (hereinafter Alice) has already been registered in the blockchain during a prior registration phase, that is to say a public key KEYA_PUB of Alice is recorded in the blockchain BC, for example in a smart contract. According to one particular embodiment of the invention, the registration is carried out by the device DD on behalf of Alice. In specific terms, Alice sends an enrolment request to the device DD, which comprises Alice's public key KEYA_PUB and an identifier of Alice (A_ID). The device DD, following receipt of the enrolment request, will publish, in the blockchain BC, for example in a smart contract managed by the device DD, Alice's identifier and public key. Of course, the device DD has already registered with the blockchain BC during a prior registration phase, that is to say the device DD possesses cryptographic keys allowing it to interact with the blockchain BC (execute operations within the BC).

According to one particular embodiment of the invention, the device DD is a server of a company that will make it possible to centralize access to a blockchain for the employees of the company.

According to one particular embodiment of the invention, the enrolment of Alice is preceded by a step of the device DD authenticating Alice. This authentication may for example take place via an identifier/password pair, a "session cookie" or any other means allowing the device DD to ensure that the enrolment request is actually sent by Alice.

In a step E10, Alice uses her terminal UE to ask the device DD to execute, on her behalf, a command (CMD_C) at the level of the blockchain BC. In specific terms, in this step E10, the terminal UE sends a request to the device DD that comprises at least Alice's command (CMD_C) encrypted via a private encryption key belonging to Alice (KEY-A_PRIV) and an identifier of Alice (A_ID). It should be noted that the request may for example be sent via an Internet browser or via a native application of the terminal UE.

In the embodiment described here, the command is encrypted using a cryptographic module located on the terminal UE. It is for example this module that allowed the generation of the pair of cryptographic keys {KEYA_PUB (public key), KEYA_PRIV (private key)} for Alice.

In another embodiment, the encryption of the command may be delegated to a chip card (SIM/eSIM/iSIM/etc.) inserted into the terminal UE or to any other terminal having a cryptographic module and able to communicate with the terminal UE.

The request is then received by the device DD in step E20. In step E21, the device DD sends, to the blockchain BC, a request comprising an identifier of Alice (A_ID) in order to retrieve Alice's public key (KEYA_PUB) recorded beforehand in the blockchain BC. In step E31, the blockchain BC receives the request and sends (E32) Alice's public key KEYA_PUB to the device DD. In step E22, the device receives the key KEYA_PUB and then attempts to decrypt the command CMD_C with the key KEYA_PUB. If the command CMD_C is decrypted correctly, then the device DD sends an execution request to execute the decrypted command (CMD) to the blockchain BC (E23). The decrypted command (CMD) is then received and then executed by the blockchain (E33). In step E24, the device DD may send, to the terminal UE, a request containing the execution status (STATUS) of the request received at E20. The status may for example comprise a code indicating the result of the decryption step (E23), but also any other information related to the execution of the request by the device DD and/or related to the execution of the command (CMD) by the blockchain (BC), such as the execution date of the command (CMD) by the blockchain, the execution duration of the command (CMD), the date of transmission and receipt of the requests transmitted and received by the device DD, etc.

It should be noted that the information related to the operations carried out by the blockchain BC may be retrieved by the device DD from the blockchain BC, in response to the request transmitted in step E23 or in response to a dedicated request (not shown).

According to one particular embodiment of the invention, in step E23, the method may send multiple execution requests to execute decrypted commands to the blockchain BC. This is for example the case when the method receives multiple execution requests from the terminal UE.

According to one particular embodiment of the invention, Alice's decryption key (that is to say Alice's public key KEYA_PUB) may be a set of multiple decryption keys. Each key may be used to decrypt all or part of the encrypted execution command in a predefined or non-predefined order.

According to one particular embodiment of the invention, the blockchain for obtaining Alice's one or more decryption keys may be different from the blockchain that executes the execution command.

According to one particular embodiment of the invention, the method may comprise a publication step (not shown) within the blockchain, in step E23 or subsequently. In specific terms, the method publishes, within the blockchain, the decrypted and/or encrypted execution command and the identifier of the user. The published data may also comprise the data STATUS. It should be noted that this publication may take place within a second blockchain dedicated to timestamping and recording submitted execution commands and/or associated identities.

According to one particular embodiment of the invention, step E20 is preceded by a step of the device DD authenticating Alice. This authentication may for example take place via an identifier/password pair, a "session cookie" or any other means allowing the device DD to ensure that the execution request is actually sent by Alice.

According to one particular embodiment of the invention, the execution command is a command to revoke one or more decryption keys of Alice that are stored in the blockchain. This mode of implementation thus makes it possible to revoke Alice's rights to use the blockchain by revoking her one or more decryption keys present in the blockchain. This revocation is carried out by adding, to the blockchain, validity information associated with Alice's decryption key. This validity information may be a Boolean, a character or a character string, a date, or any other information for determining the validity of the user's decryption key at a given time. It should be noted that the one or more decryption keys may be associated by default with validity information having a predefined value. For example, in Alice's prior registration within the blockchain, Alice's public key KEYA_PUB may be associated by default with validity information indicating that the key KEYA_PUB is valid without a time limit. Conversely, the validity information associated by default with Alice's public key KEYA_PUB may indicate that the key KEYA_PUB is invalid. In this case, a step of activating the key KEYA_PUB will be necessary for Alice to be able to use the blockchain via the device DD. In specific terms, the method will transmit, to the blockchain BC, a request to modify the validity information associated with Alice's key KEYA_PUB so that the key KEYA_PUB becomes valid, that is to say active. Of course, the modification/activation request comprises at least one identifier of Alice (A_ID) and potentially an identification datum for one or more keys of Alice, such as for example a number, a character, a character string, an address, etc. It should be noted that this request may occur before step E20, when for example a user of the device DD wishes to assign Alice the right to use the blockchain BC, or in step E20 after receiving an execution request from Alice's terminal UE comprising an encrypted execution command (CMD_C) and an identifier of Alice. For the latter case, the execution of the modification/activation request may also be made conditional on validation of a user via a human-machine interface of the device DD or on the value of a user datum (a character or a character string, a date, a Boolean, etc.) obtained for example from a database. Indeed, the device DD may for example consult Alice's user profile before transmitting, to the blockchain BC, a request to modify the validity information associated with Alice's key KEYA_PUB.

According to one particular embodiment of the invention, the execution command is a command to deploy a smart contract within said at least one first blockchain.

It goes without saying that the embodiment that has been described above has been given purely by way of indication and with no limitation whatsoever, and that many modifications may easily be made thereto by those skilled in the art without, however, departing from the scope of the invention.

The invention claimed is:

1. An access control method for delegating access to at least one first blockchain, implemented by an access delegation device, the method comprising:
   receiving an execution request from a terminal of a user, said request comprising at least one identifier of the user and at least one execution command to execute an action within said at least one first blockchain, said command being encrypted via at least one encryption key belonging to said user;
   obtaining, on the basis of said at least one received identifier of said user, at least one decryption key of said user allowing said execution command to be decrypted;
   decrypting said execution command using the at least one decryption key; and
   transmitting, to said at least one first blockchain, an execution request to execute said execution command decrypted via said at least one decryption key.

2. The access control method as claimed in claim 1, wherein said at least one decryption key of said user is obtained from at least one second blockchain.

3. The access control method as claimed in claim 2, wherein said at least one first blockchain corresponds to said at least one second blockchain.

4. The access control method as claimed in claim 1, wherein the receiving is preceded by authenticating said user.

5. The access control method as claimed in claim 1, wherein the transmitting is preceded by publishing, in said at least one first blockchain, said at least one identifier of said user and said decrypted execution command and/or said encrypted execution command.

6. The access control method as claimed in claim 3, wherein the decrypted execution command is a command to revoke said at least one decryption key of said at least one second blockchain.

7. The access control method as claimed in claim 1, wherein the decrypted execution command is a command to deploy a smart contract within said at least one first blockchain.

8. The access control method as claimed in claim 1, wherein the decrypted execution command is a command to execute a smart contract stored in said blockchain.

9. A device for delegating access to at least one first blockchain, wherein the device comprises:
   at least one processor; and at least one non-transitory computer readable medium comprising instructions stored thereon which when executed by the at least one processor configure the device to implement a method comprising:

receiving an execution request from a terminal of a user, said request comprising at least one identifier of the user and at least one execution command to execute an action within said at least one first blockchain, said command being encrypted via at least one encryption key belonging to said user;

obtaining, on the basis of said at least one received identifier of said user, at least one decryption key of said user allowing said execution command to be decrypted;

decrypting said execution command using the at least one decryption key; and transmitting, to said at least one first blockchain, an execution request to execute said execution command decrypted via said at least one decryption key.

10. A non-transitory computer readable medium comprising a computer program stored thereon comprising instructions for implementing a method for delegating access to at least one first blockchain when the program is executed by a processor, wherein the method comprises:

receiving an execution request from a terminal of a user, said request comprising at least one identifier of the user and at least one execution command to execute an action within said at least one first blockchain, said command being encrypted via at least one encryption key belonging to said user;

obtaining, on the basis of said at least one received identifier of said user, at least one decryption key of said user allowing said execution command to be decrypted;

decrypting said execution command using the at least one decryption key; and transmitting, to said at least one first blockchain, an execution request to execute said execution command decrypted via said at least one decryption key.

\* \* \* \* \*